United States Patent [19]

Trepka

[11] 4,412,087

[45] Oct. 25, 1983

[54] VISCOSITY INDEX IMPROVER WITH HIGH THICKENING POWER

[75] Inventor: William J. Trepka, Bartlesville, Okla.

[73] Assignee: Phillips Petroleum Company, Bartlesville, Okla.

[21] Appl. No.: 331,421

[22] Filed: Dec. 16, 1981

[51] Int. Cl.$^3$ .............................................. C10M 1/18
[52] U.S. Cl. .................................. 585/12; 252/32.7 E; 252/51.5 A
[58] Field of Search ..................... 585/12; 252/32.7 E, 252/51.5 A

[56] References Cited

U.S. PATENT DOCUMENTS

| | | |
|---|---|---|
| 2,798,853 | 7/1957 | Young et al. . |
| 2,864,809 | 12/1958 | Jones et al. . |
| 2,975,160 | 3/1961 | Zelinski . |
| 3,333,024 | 7/1967 | Haefele et al. . |
| 3,402,159 | 9/1968 | Hsieh . |
| 3,419,365 | 12/1968 | Streets . |
| 3,431,323 | 3/1969 | Jones . |
| 3,531,450 | 9/1970 | Yoshimoto et al. . |
| 3,547,821 | 12/1970 | McCoy et al. . |
| 3,554,911 | 1/1971 | Schiff et al. . |
| 3,600,311 | 8/1971 | Nakman et al. . |
| 3,630,905 | 12/1971 | Sorgo . |
| 3,752,767 | 8/1973 | Eckert . |
| 3,761,404 | 9/1973 | Calow et al. . |
| 3,772,169 | 11/1973 | Small et al. . |
| 3,772,196 | 11/1973 | St. Clair et al. ................ 252/32.7 E |
| 3,994,815 | 11/1976 | Coleman ........................... 252/52 R |
| 4,073,738 | 2/1978 | Ladenberger et al. . |
| 4,145,298 | 3/1979 | Trepka . |
| 4,162,985 | 7/1979 | Holubee . |

FOREIGN PATENT DOCUMENTS

| | | |
|---|---|---|
| 2,061,961 | 5/1981 | United Kingdom. |
| 1567654 | 5/1980 | United Kingdom . |
| 2,228,105 | 4/1974 | France. |

OTHER PUBLICATIONS

Gruse et al., *Chemical Technology of Petroleum* (McGraw–Hill 1960), pp. 15, 16, 52, 53.

*Primary Examiner*—Jacqueline V. Howard

[57] ABSTRACT

Hydrogenated random block conjugated diene/monovinylarene copolymers with a terminal monovinylarene block having a diene content in the range of 44 to 70 weight percent, normalized vinyl in the range 30.2–51.3 percent, percent vinyl based on copolymer plus percent styrene in the range 59.8–71.5 percent, and molecular weight $M_n$ in the range 94,000–199,000, used as viscosity index improver in lubricating oil, exhibits unusually high thickening power, yet provides viscosity index, pour point, and shear loss at very desirable levels.

22 Claims, No Drawings

VISCOSITY INDEX IMPROVER WITH HIGH THICKENING POWER

FIELD OF THE INVENTION

The invention relates to novel copolymers. The invention in another aspect relates to lubricating oil compositions. The invention further relates to lubricating oil additives. In a still further aspect, the invention pertains to copolymers which, in combination with lubricating oil, exhibit high thickening power with low quantities of copolymer.

BACKGROUND OF THE INVENTION

Mineral oil stocks are a prime source of lubricants for an almost endless list of applications. Lubricating oils and related hydraulic and transmission fluids for present day machinery, internal-combustion engines, and other uses, contain a wide variety of additives.

Increased engine operating temperatures and increased complexity of antipollution devices associated with such engines have resulted in substantial increases in additive quantities in automotive lubricating oils. The quantities of additives employed for improved properties in some instances have been approaching quantities so large as to affect negatively the primary mission of the lubricating oil: to lubricate.

Many materials have been prepared for use in lube oils as viscosity index improvers, such as described in U.S. Pat. No. 3,554,911, U.S. Pat. No. 3,630,905, and British Pat. No. 1,567,654. U.S. Pat. No. 3,994,815 summarizes some of the various hydrogenated arene/conjugated diene copolymers used in lubricating oils as viscosity index improvers.

Needed are polymeric products which are temperature stable, substantially non-degradable by oxygen/temperature, and capable of producing a high level of thickening power in oil at much lower dosage levels than heretofore feasible. With increased costs of base petroleum stocks, it is necessary to find ways to improve thickening powers of viscosity index improvers, to hold down amounts thereof required, and thus hold down costs of the lubricating oils to the American motorist.

BRIEF SUMMARY OF THE INVENTION

I have discovered a specific class of hydrogenated conjugated diene/monovinylarene random block copolymers exhibiting high effectiveness as viscosity index improvers with good thickening power, better thickening powers than heretofore available, thus requiring lower quantities in lubricating mineral oils, while retaining desirably low pour point and high shear stability.

These copolymers are defined by the following parameters: about 44–70 weight percent of conjugated diene; about 30–56 weight percent of total monovinylarene of which about 9–23 weight percent is terminal block monovinylarene; molecular weight $M_n$ of about 94,000–199,000; vinyl weight percent, prior to hydrogenation, based on diene (normalized), of about 30–51; vinyl weight percent, prior to hydrogenation, based on the entire copolymer, of about 13 to 33; and weight percent vinyl (based on entire copolymer) plus weight percent monovinylarene about 60–72.

These copolymers are employed in mineral-based lubricating oils at any desired concentration effective for required viscosity at 210° F., viscosity index, pour point, and sonic shear viscosity loss (a measure of shear stability). Examples of suitable and presently preferred lubricating oils comprise a mixture of Kansas City 10-Stock and 20-Stock napthenic oils, (marketed by Phillips Petroleum Company) containing commercially available detergents, antioxidant and antiwear agents, and pour point depressants.

These copolymers are classed as "random-block" copolymers and can be represented by B/A-A or A/B-A. More particularly, they contain a "block" of randomized copolymer which can be represented by B/A and A/B which represent copolymerized conjugated diene B and copolymerized monovinylarene A in the random block, A by itself represents a homopolymeric block of polymonovinylarene. Presently preferred are butadiene/styrene copolymers.

My new class of defined outstanding viscosity index improvers additionally are ashless. Lubricating oils and related fluids containing these additives are provided with the benefits of viscosity index improvers without adding ash into the resulting lubricating oil composition.

The viscosity of lubricating oils of course varies with the temperature. Many oils must be employed over a wide temperature range, e.g., 0° F. to 300° F., and it is important that the oil be not too viscous at low temperatures nor too thin at high temperatures. Variation of the viscosity-temperatures relationship of an oil is indicated by the viscosity index value. The higher the viscosity index, the less the change in viscosity with change in temperature. Viscosity at 210° F. and at 100° F. is used to determine the viscosity index.

My copolymers can be used in oil at any desired concentration effective for the required charge in viscosity index. If desired, the copolymers can be dissolved in a carrier to make a high concentration additive which can be conveniently used by motor oil manufacturers, blenders, or branders.

DETAILED DESCRIPTION OF THE INVENTION

The copolymers which I have prepared and which are employed in lubricating and other oil based applications are additives to base mineral oils are prepared by copolymerizing at least one hydrocarbon conjugated diene and at least one monovinylarene hydrocarbon, preferably butadiene and styrene, to produce copolymers, and hydrogenating to produce hydrogenated copolymers. These copolymers can be prepared by means known in the art of solution polymerization, and basically can be prepared in any of three modes, or even a combination of modes.

A mixture of monovinylarene and conjugated diene can be copolymerized, controlling the rate of polymerization and proportion of each copolymerized comonomer by either a randomizing agent, or by feed of the comonomers, to produce a copolymerized block of desired size, and then without terminating the initiator in any manner adding monovinylarene monomer alone so as to provide the polymonovinylarene block. In a third method, a mixture of conjugated diene and monovinylarene are permitted to copolymerize to produce a random copolymer block which can be tapered, and, since the conjugated diene tends to polymerize more rapidly it will polymerize to extinction, and then additional monovinylarene can be added to polymerize thereonto to form a homopolymeric block.

A combination of such steps, of course, can be employed, since such as copolymerizing a mixture to form a random block, permitting remaining monovinylarene to homopolymerize, and yet adding additional monovinylarene to increase the size of the homopolymeric block, where desired.

Whatever the technique, readily practiced by those skilled in the art, the following preferred parameters should be observed:

Conjugated diene—44.1–69.9 weight percent
Total monovinylarene—55.9–30.1 weight percent
Block polymonovinylarene—9.3–23.2 weight percent
Molecular weight $M_n$—94,000–199,000
Vinyl, before hydrogenation, based on conjugated diene—30.2–51.3 weight percent
Vinyl, before hydrogenation, based on entire copolymer—13.3–33.4 weight percent
Weight percent vinyl, based on copolymer, plus weight percent monovinylarene—59.8–71.5 weight percent At present, the additives of this invention are employable in any suitable and effective amount in a lubricating oil. These products are most useful by employing a lower than usual amount, since they provide greater thickening power than heretofore available. As will be demonstrated by comparative tests, my copolymers provide significantly improved thickening power at much lower-than-usual dosages.

CONJUGATED DIENE/MONOVINYLARENE COPOLYMERS

In my discussions hereinafter for simplicity and convenience I use styrene as representative of as well as the preferred monovinylarene, and butadiene as representative of as well as the preferred conjugated diene. Similarly butadiene/styrene copolymers are discussed as representative of the applicable conjugated diene/monovinylarene copolymers generally.

Conjugated diene monomers suitable for making copolymers of my invention are those aliphatic hydrocarbon dienes of four to eight carbon atoms per molecule. Exemplary dienes include butadiene, isoprene, 2,3-dimethylbutadiene, piperylene, and the like.

Suitable copolymers will contain about 44.1–69.9 weight percent butadiene (or other hydrocarbon conjugated diene), and correspondingly about 55.9–30.1 weight percent styrene (or other hydrocarbon monovinylarene). These copolymers are defined as random block copolymers, meaning that they do have a significant block of polystyrene homopolymer, (9.3–23.2 weight percent based on copolymer), and a significant block of copolymerized poly(butadiene/styrene). These copolymerized blocks may be of random, or random tapered character, can be represented by B/A, A/B, sometimes written B/A, sometimes A/B. In any event, the copolymers herein are generically represented by B/A-A in which B/A represents any of the aforesaid types of random block, and A represents the homopolymeric block.

Exemplary copolymers as those of butadiene and styrene, isoprene and styrene, butadiene and α-methylstyrene, and isoprene and α-methylstyrene.

The most preferred butadiene/styrene copolymers should have preferred ranges as follows:

Butadiene, weight percent—52.2–69.9
Total Styrene, weight percent—47.8–30.1
Block Styrene, weight percent—9.3–21.0
Molecular Weight $M_n$—94,000–199,000
Vinyl, before hydrogenation, based on butadiene, weight percent—32.4–51.3
Vinyl, before hydrogenation, based on entire copolymer, weight percent—16.9–33.4
Weight percent Vinyl, based on copolymer, plus weight percent styrene—59.8–71.5

POLYMERIZATION

Polymerization is conducted by contacting the monomer charge with a monoalkali metal initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Exemplary are temperatures in the range of about 0° C. to 200° C., presently preferred about 50° C. to 70° C., since these temperatures are consistent with obtaining the desired copolymers. Pressures employed can be as convenient, though preferably pressures are employed sufficient to maintain monomers and diluent substantially in the liquid phase. Polymerization times can vary widely as may be convenient, dependent on polymerization temperatures chosen. Time chosen should be such that substantially complete conversion of monomers is obtained.

Any of the hydrocarbon monolithium (or other monoalkali metal) initiators known in the anionic solution polymerization arts can be employed. Typically these can be represented by RLi wherein R is a hydrocarbon radical and can be aliphatic, cycloaliphatic, or aromatic, containing at least one carbon atom per molecule. The number of carbon atoms and consequently the molecular weight of the hydrocarbon lithium initiator is not limited as far as operability is concerned, though those of up to about 20 carbon atoms are more readily available. Most frequently employed are the aliphatic monolithium types. Exemplary species include such as n-butyllithium, sec-butyllithium, n-decyllithium, phenyllithium, 1-naphthyllithium, p-tolyllithium, cyclohexyllithium, eicosyllithium, and the like. The presently preferred species are sec-butyllithium and n-butyllithium for commercial availability. If an n-alkyllithium initiator is employed, it usually is advisable to include a minimal amount of a polar compound, such as tetrahydrofuran, to increase initiator activity and efficiency. Such a polar compound may also act as a randomizer and a vinyl promoter.

Such hydrocarbyl monolithium initiators are employed in an amount effective for polymerization of the monomer charge employed to the molecular weight desired. Typically, an exemplary amount is in the range of about 0.33 to 5 mhm, millimoles per 100 grams of monomer, presently preferred about 0.67 to 1.0 mhm, consistent with obtaining polymers of desired molecular weight ranges.

A randomizing agent in effective amounts can be included where needed, at the suitable stage in the polymerization, typically selected from ethers, thioethers, and amines, and others as is known in the art, such as tetrahydrofuran, or from the alkali metal alkoxides other than of lithium, such as potassium t-butoxide or amyloxide; others include such as methyl ethyl ether, 1,2-dimethoxyethane, dimethyl ether, N,N,N',N'-tetramethylethylenediamine, bis(2-methoxyethyl)ether, and 1,2-bis(2-methoxyethoxy)ethane. The presently preferred randomizer and vinyl promoter is tetrahydrofuran employed in amounts ranging from 1.8 to 10 parts per 100 parts of total monomers.

The reactants, apparatus involved, diluents, and the like, should be maintained substantially free of various substances known to be detrimental to the initiator, including such as carbon dioxide, oxygen, or water, and the like.

HYDROGENATION

The hydrogenation procedure employed should be effective so as to substantially reduce olefinic unsaturation, including vinyl unsaturation, while leaving essentially untouched aromatic unsaturation present in the styrene-derived portion of the copolymer.

Hydrogenation can be conveniently conducted directly on the unquenched polymerization reaction admixture from the polymerization procedure described above. Alternatively, where convenient, the copolymerization can be quenched by addition of suitable amounts of a lower alcohol, water, or the like, to effectively kill active polymer-lithium species. The quenched copolymer then can be recovered by means known in the art, such as by steam-stripping. For hydrogenation purposes, the defined copolymers can be dissolved or redissolved in a suitable solvent, by means known in the art for this purpose.

Particularly favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogen catalysts include reduced nickel-kieselguhr catalyst. The preferred hydrogenation catalyst is a 2:1 mole ratio mixture of triethylaluminum and nickel octoate.

Exemplary are hydrogenation temperatures in the range of about 25° C. to 175° C. Pressures can range up to such as about 1,000 psig. Times can range from a few minutes such as about 30 minutes to several hours such as 4 hours or more, influenced not only by the temperature and pressure chosen, but also by the concentration of the copolymer in the diluent, since this affects the viscosity of the copolymeric solution being treated.

Effective selective hydrogenation reduces at least about 97 weight percent generally about 99 weight percent of the olefinic groups, and no more than about 5 percent or less of the phenyl groups, as determined by infrared spectrophotometry.

Following completion of the copolymer hydrogenation step, the hydrogenation catalyst is deactivated and removed by any of the usual means known in the art. A typical procedure includes the addition of a solution of such as phosphoric acid and ammonium phosphate in such as about a 1:4 weight ratio, followed by introduction of air to convert the catalyst metals to insoluble phosphates, and removal thereof by filtration. The hydrogenated copolymer can be recovered by known methods, such as alcohol coagulation or steam stripping, dried under reduced pressure, followed by redissolving in an inert diluent, such as those described for the polymerization solvent.

The modified polymer is recovered using any convenient means such as by coagulation treatment with a lower alcohol followed by filtration and any desired purification steps.

OIL COMPOSITIONS

The copolymeric compositions in accordance with my invention can be incorporated as needed into mineral oils including lubricating and other oils using any suitable procedures.

In the preparation of lubricating compositions, various mineral oils are employed. Generally, these are of petroleum origin and are complex mixtures of many hydrocarbon compounds, though they can be derived from coal conversion, tar sands, shale oil, and the like. Preferably, the mineral oils are refined products such as are obtained by well-known refining processes, such as by hydrogenation, by polymerization, by dewaxing, etc. Frequently, the oils have a Saybolt viscosity at 100° F. in the range of about 60 to 5,000, and a Saybolt viscosity at 210° F. of about 30 to 250. The oils can be of paraffinic, naphthenic, or aromatic types, as well as mixtures of two or more types. However, the additives of my invention have special advantages when employed with paraffinic types of oils such as are obtained by solvent extraction of a suitable refinery stream. Many suitable lubricating compositions can be prepared, such as motor oils, gear oils, automatic transmission oils, and the like.

In addition to the additives of this invention, the lubricating compositions can comprise one or more of other additives known to those skilled in the art, such as antioxidants, pour-point depressants, dyes, detergents, etc. Examples of these additives are the metal petroleum sulfonates, zinc dialkyldithiophosphates, alkyl succinimides, and the like. To be of commercial interest as a motor oil, the lubricating composition generally preferably presently should have a viscosity index of at least about 115.

My unique copolymers find application in use in lubricating oils, automatic transmission fluids, tractor hydraulic fluids, industrial hydraulic oils, aviation oils, and the like, in any broad effective range. A suggested broad amount is in the range of about 0.2 to 2.0 weight percent. For most usages, the presently preferred range is about 0.8 to 1.6 weight percent (most preferred: 0.8–1.2 weight percent) in motor oils, and similarly in industrial hydraulic fluids. Typical usages anticipated in specific applications are about 0.2 to 2.0, preferably about 0.4 to 1.0 weight percent in automotive transmission fluids; about 0.2 to 2.0, preferably about 0.3–1.0 weight percent in industrial hydraulic fluids; about 0.2 to 2.0, preferably about 0.3–0.8 weight percent in aviation oils. For the first cited application, the preferred amounts are substantially below those of a commercial 40/60 VII used generally at about 2.2 to 3 weight percent in motor oils.

My additives in concentration in oil at such as about 0.8 to 1.2 weight percent, presently the most preferred range, exhibit a viscosity of about 72–76 SUS at 99°–100° C. in a mineral oil, viscosity index 136–194, pour-point minus 40° F. to minus 15° F., sonic shear loss less than 4.5 sec. These are highly effective benefits shown.

Where desired, a "concentrate" of any additive in a suitable mineral-based oil stock, such as about 5 to 30, preferably 7-20, weight percent copolymer relative to the total of oil and additive. The concentrate then can be diluted as desired or convenient with mineral oil based stocks to make the lubricating oil for use in equipment as needed.

EXAMPLES

Examples are provided designed to further an understanding of my invention, without limiting the scope thereof. Particular species employed, particular conditions, amounts and materials, ranges and materials, and the like, employed in these examples, are designed to be exemplary, and are directed to one skilled in the art, and are not intended to be limitative of the reasonable scope of my invention.

EXAMPLE I

Synthesis

Parent polymers for hydrogenation were prepared by bottle polymerization techniques. Polymerization was sequential. Random butadiene/styrene copolymer was prepared in the first step. Additional styrene was added after the random block had formed to prepare a terminal polystyrene block. The polymer was hydrogenated subsequently without being isolated from solution.

The parent polymer (before hydrogenation) was analyzed for vinyl and trans unsaturation by infrared spectrometry. Molecular weights were determined by gel-permeation chromatography. All polymers were gel free.

Live cement was hydrogenated in a one-half gallon, glass Chemco reactor. Hydrogen pressure was constant 50 psig and the hydrogenation catalyst, premixed in a small amount of cyclohexane, was constituted of a 2 to 1 mole ratio of triethylaluminum and nickel octoate.

Hydrogenation catalyst was terminated by aqueous ammonium phosphate solution. Air was added after 0.5 hr. at 50° C. to convert the metals to insoluble phosphates. These were removed by filtration through 10μ-pore, polypropylene filter. The filtered polymer was isolated by alcohol coagulation. Residual unsaturation of the dried polymer was determined by infrared spectrophotometric analysis.

The recipe used for preparation of B/S-S viscosity index improvers is shown below.

| RECIPE BUTADIENE/STYRENE (B/S-S) RANDOM-BLOCK VISCOSITY INDEX IMPROVER RECIPE | |
|---|---|
| Step No. 1 | |
| (Preparation of random B/S) | |
| Cyclohexane, parts | 700–800 |
| Butadiene | Variable |
| Styrene | Variable |
| Tetrahydrofuran | Variable |
| n-Butyllithium | Variable |
| Temp., °C. | 70° all runs except 50° runs 31, 56, 59, 61, 62, 68, 73, 74, 75, 77, 78 |
| Time, min. | Variable |
| Step No. 2 | |
| (Preparation of styrene (S) block) | |
| Styrene | Variable |
| Temp., °C. | 70 |
| Time, min. | Variable |
| Step No. 3 | |
| (Hydrogenation) | |
| Random-Block B/S-S Copolymer, parts | 100 (in cyclohexane) |
| Additional Cyclohexane, added to make mL | 1000 (total solution) |
| Hydrogenation catalyst mhp[a] | 5.0 |
| Hydrogen, constant psig | 50 |
| Temp., °C. | 50 |
| Time, min. | 20 |
| Step No. 4 | |
| (Isolation) | |
| Aqueous ammonium phosphate (55%), ml | 2.0 |
| Temp., °C. | 50 |
| Time, hr. | 0.5 |
| Air pressure, psi | 25 |
| Temp., °C. | 50 |
| Time, hrs. | 16–18 |
| Filtering | — |
| Coagulating with Isopropanol | — |
| Drying in Vacuum Oven at 70° C. | |

[a]gram-millimoles per 100 grams of polymer

Table I shows further details regarding amounts of reagents and polymerization conditions for twenty control runs (outside the inventive ranges) and fifty-eight inventive runs.

TABLE I

| | | STEP I | | | | | STEP II | |
|---|---|---|---|---|---|---|---|---|
| | | Butadiene parts | Styrene parts | Tetrahydro-furan parts | Effective n-Butyl-lithium mhm[a] | Time minutes | Styrene parts | Time minutes |
| Control | Run 1 | 40 | 40 | 1.75 | 0.67 | 20 | 20 | 30 |
| Control | Run 2 | 40 | 40 | 1.75 | 1.00 | 20 | 20 | 30 |
| Control | Run 3 | 40 | 40 | 1.75 | 1.33 | 20 | 20 | 30 |
| Control | Run 4 | 40 | 40 | 1.75 | 0.90 | 20 | 20 | 30 |
| Control | Run 5 | 40 | 40 | 1.75 | 1.54 | 20 | 20 | 30 |
| Control | Run 6 | 40 | 40 | 1.75 | 0.40 | 20 | 20 | 30 |
| Control | Run 7 | 40 | 45 | 1.75 | 0.67 | 20 | 15 | 15 |
| Control | Run 8 | 40 | 50 | 1.75 | 0.40 | 20 | 10 | 30 |
| Control | Run 9 | 40 | 45 | 2.0 | 0.67 | 20 | 15 | 15 |
| Control | Run 10 | 40 | 45 | 3.0 | 0.67 | 20 | 15 | 15 |
| Control | Run 11 | 40 | 40 | 5.0 | 1.00 | 20 | 20 | 15 |
| Control | Run 12 | 43 | 43 | 2.0 | 0.67 | 20 | 14 | 15 |
| Control | Run 13 | 43 | 43 | 1.75 | 0.67 | 20 | 14 | 15 |
| Control | Run 14 | 43 | 43 | 3.0 | 0.67 | 20 | 14 | 15 |
| Invention | Run 15 | 45 | 40 | 1.75 | 0.67 | 20 | 15 | 15 |
| Invention | Run 16 | 45 | 40 | 3.0 | 0.67 | 20 | 15 | 15 |
| Invention | Run 17 | 45 | 40 | 2.0 | 0.67 | 20 | 15 | 15 |
| Invention | Run 18 | 50 | 35 | 1.75 | 0.67 | 20 | 15 | 15 |
| Invention | Run 19 | 50 | 30 | 7.5 | 0.67 | 15 | 20 | 15 |
| Invention | Run 20 | 50 | 30 | 5.0 | 0.8 | 15 | 20 | 15 |
| Invention | Run 21 | 50 | 35 | 2.0 | 0.67 | 20 | 15 | 15 |
| Invention | Run 22 | 50 | 30 | 5.0 | 0.67 | 15 | 20 | 15 |
| Invention | Run 23 | 50 | 30 | 7.5 | 0.8 | 15 | 20 | 15 |
| Invention | Run 24 | 50 | 30 | 10.0 | 0.8 | 15 | 20 | 15 |

TABLE I-continued

|  |  | STEP I | | | | | STEP II | |
|---|---|---|---|---|---|---|---|---|
|  |  | Butadiene parts | Styrene parts | Tetrahydro-furan parts | Effective n-Butyl-lithium mhm[a] | Time minutes | Styrene parts | Time minutes |
| Invention | Run 25 | 50 | 35 | 3.0 | 0.67 | 20 | 15 | 15 |
| Invention | Run 26 | 50 | 30 | 10.0 | 0.67 | 15 | 20 | 15 |
| Invention | Run 27 | 50 | 30 | 5.0 | 1.0 | 20 | 20 | 15 |
| Invention | Run 28 | 50 | 30 | 10.0 | 1.0 | 20 | 20 | 15 |
| Invention | Run 29 | 53 | 32 | 5.0 | 0.67 | 15 | 15 | 15 |
| Invention | Run 30 | 53 | 32 | 7.5 | 0.67 | 15 | 15 | 15 |
| Invention | Run 31 | 52 | 35 | 4.0 | 0.67 | 150 | 13 | 60 |
| Invention | Run 32 | 53 | 32 | 10.0 | 0.67 | 15 | 15 | 15 |
| Invention | Run 33 | 55 | 30 | 5.0 | 0.67 | 10 | 15 | 15 |
| Invention | Run 34 | 55 | 25 | 5.0 | 0.67 | 15 | 20 | 15 |
| Invention | Run 35 | 55 | 25 | 10.0 | 0.67 | 15 | 20 | 15 |
| Invention | Run 36 | 55 | 25 | 7.5 | 0.67 | 15 | 20 | 15 |
| Invention | Run 37 | 55 | 25 | 10.0 | 0.8 | 15 | 20 | 15 |
| Invention | Run 38 | 55 | 25 | 7.5 | 0.8 | 15 | 20 | 15 |
| Invention | Run 39 | 56 | 26 | 10.0 | 0.8 | 15 | 18 | 15 |
| Invention | Run 40 | 56 | 26 | 7.5 | 0.8 | 15 | 18 | 15 |
| Invention | Run 41 | 56 | 26 | 5.0 | 0.8 | 15 | 18 | 15 |
| Invention | Run 42 | 55 | 25 | 5.0 | 0.8 | 15 | 20 | 15 |
| Invention | Run 43 | 60 | 20 | 7.5 | 0.8 | 15 | 20 | 15 |
| Invention | Run 44 | 58 | 27 | 10.0 | 0.67 | 15 | 15 | 15 |
| Invention | Run 45 | 58 | 27 | 7.5 | 0.67 | 15 | 15 | 15 |
| Invention | Run 46 | 51 | 31 | 7.5 | 0.8 | 15 | 18 | 15 |
| Invention | Run 47 | 51 | 31 | 10.0 | 0.8 | 15 | 18 | 15 |
| Invention | Run 48 | 51 | 31 | 5.0 | 0.8 | 15 | 18 | 15 |
| Invention | Run 49 | 60 | 20 | 7.5 | 0.67 | 15 | 20 | 15 |
| Invention | Run 50 | 60 | 20 | 10.0 | 0.8 | 15 | 20 | 15 |
| Invention | Run 51 | 60 | 20 | 10.0 | 1.0 | 20 | 20 | 15 |
| Invention | Run 52 | 62 | 20 | 10.0 | 0.8 | 15 | 18 | 15 |
| Invention | Run 53 | 62 | 20 | 7.5 | 0.8 | 15 | 18 | 15 |
| Invention | Run 54 | 64 | 21 | 7.5 | 0.67 | 15 | 15 | 15 |
| Invention | Run 55 | 64 | 21 | 10.0 | 0.67 | 15 | 15 | 15 |
| Invention | Run 56 | 64.8 | 21.6 | 4.0 | 0.91 | 150 | 13.6 | 30 |
| Invention | Run 57 | 64 | 18 | 10.0 | 1.0 | 20 | 18 | — |
| Invention | Run 58 | 64 | 18 | 5.0 | 1.0 | 20 | 18 | — |
| Invention | Run 59 | 65.6 | 21.9 | 4.0 | 0.83 | 150 | 12.5 | 30 |
| Invention | Run 60 | 65 | 18 | 8.0 | 1.0 | 15 | 17 | 15 |
| Invention | Run 61 | 66.4 | 22.1 | 4.0 | 0.77 | 150 | 11.5 | 30 |
| Invention | Run 62 | 67 | 23 | 4.0 | 0.67 | 150 | 10 | 30 |
| Invention | Run 63 | 66 | 18 | 10.0 | 0.9 | 15 | 16 | 15 |
| Invention | Run 64 | 66 | 18 | 5.0 | 0.9 | 20 | 16 | — |
| Invention | Run 65 | 65 | 18 | 8.0 | 0.9 | 15 | 16 | 15 |
| Invention | Run 66 | 65 | 18 | 10.0 | 1.0 | 15 | 17 | 15 |
| Invention | Run 67 | 66 | 18 | 10.0 | 0.9 | 20 | 16 | — |
| Invention | Run 68 | 67.5 | 22.5 | 4.0 | 0.67 | 150 | 10 | 30 |
| Invention | Run 69 | 67 | 19 | 10.0 | 0.8 | 15 | 14 | 15 |
| Invention | Run 70 | 67 | 19 | 8.0 | 0.8 | 15 | 14 | 15 |
| Invention | Run 71 | 70 | 20 | 10.0 | 0.67 | 10 | 10 | 15 |
| Invention | Run 72 | 70 | 10 | 10.0 | 1.0 | 20 | 20 | 15 |
| Control | Run 73 | 65.6 | 21.9 | 4.0 | 0.83 | 150 | 12.5 | 30 |
| Control | Run 74 | 64.8 | 21.6 | 4.0 | 0.91 | 150 | 13.6 | 30 |
| Control | Run 75 | 70 | 20 | 3.0 | 0.67 | 120 | 10 | 15 |
| Control | Run 76 | 70 | 20 | 3.0 | 0.67 | 30 | 10 | 15 |
| Control | Run 77 | 70 | 20 | 10.0 | 0.67 | 60 | 10 | 15 |
| Control | Run 78 | 70 | 20 | 5.0 | 0.67 | 120 | 10 | 15 |

[a]mhm = gram-millimoles per 100 gram of total monomer (butadiene plus styrene of Steps I and II).

EXAMPLE II

Pertinent structural parameters of prepared viscosity index improve polymers are listed in Table II:

TABLE II

| | | POLYMER PROPERTIES | | | | | | |
|---|---|---|---|---|---|---|---|---|
| | | I | II | III | IV | V | VI | VII |
| | | | | | | Weight % Vinyl (before Hydrogenation) | | Vinyl + |
| | | [a]Butadiene Weight % | [b]Total Styrene Weight % | [c]Block Styrene Weight % | [d]Molecular Weight $M_n \times 10^{-3}$ | [e]based on butadiene | [f]based on copolymer | Styrene II + VI |
| Control | Run 1 | 35.8 | 64.2 | 27.5 | 144 | 26.5 | 9.5 | 73.7 |
| Control | Run 2 | 35.9 | 64.1 | 32.4 | 114 | 26.2 | 9.4 | 73.5 |
| Control | Run 3 | 36.1 | 63.9 | 29.2 | 84 | 27.4 | 9.9 | 73.8 |
| Control | Run 4 | 36.5 | 63.5 | 28.9 | 226 | 25.5 | 9.3 | 72.8 |
| Control | Run 5 | 36.8 | 63.2 | 28.9 | 76 | 24.2 | 8.9 | 72.1 |
| Control | Run 6 | 37.3 | 62.7 | 28.3 | 276 | 24.9 | 9.3 | 72.0 |
| Control | Run 7 | 39.0 | 61.0 | 25.0 | 122 | 30.0 | 11.7 | 72.2 |
| Control | Run 8 | 39.0 | 61.0 | 20.2 | 200 | 31.5 | 12.3 | 73.3 |

TABLE II-continued

POLYMER PROPERTIES

| | | I | II | III | IV | V | VI | VII |
|---|---|---|---|---|---|---|---|---|
| | | | | | | Weight % Vinyl (before Hydrogenation) | | Vinyl + |
| | | (a)Butadiene Weight % | (b)Total Styrene Weight % | (c)Block Styrene Weight % | (d)Molecular Weight $M_n \times 10^{-3}$ | (e)based on butadiene | (f)based on copolymer | Styrene II + VI |
| Control | Run 9 | 39.2 | 60.8 | 24.7 | 108 | 30.1 | 11.8 | 72.6 |
| Control | Run 10 | 39.4 | 60.6 | 22.8 | 122 | 34.5 | 13.6 | 74.2 |
| Control | Run 11 | 40.9 | 59.1 | 26.6 | 83 | 31.8 | 13.0 | 72.1 |
| Control | Run 12 | 41.6 | 58.4 | 23.1 | 111 | 31.0 | 12.9 | 71.3 |
| Control | Run 13 | 41.9 | 58.1 | 23.4 | 115 | 30.1 | 12.6 | 70.7 |
| Control | Run 14 | 41.9 | 58.1 | 21.9 | 121 | 32.9 | 13.8 | 71.9 |
| Invention | Run 15 | 44.1 | 55.9 | 30.2 | 97 | 30.2 | 13.3 | 69.2 |
| Invention | Run 16 | 44.1 | 55.9 | 21.1 | 113 | 34.5 | 15.2 | 71.1 |
| Invention | Run 17 | 44.4 | 55.6 | 22.0 | 108 | 31.5 | 14.0 | 69.6 |
| Invention | Run 18 | 48.5 | 51.5 | 20.3 | 106 | 30.3 | 14.7 | 66.2 |
| Invention | Run 19 | 48.6 | 51.4 | 22.0 | 120 | 36.0 | 17.5 | 68.9 |
| Invention | Run 20 | 49.0 | 51.0 | 23.2 | 128 | 35.3 | 17.3 | 68.3 |
| Invention | Run 21 | 49.0 | 51.0 | 19.3 | 132 | 31.8 | 15.6 | 66.6 |
| Invention | Run 22 | 49.0 | 51.0 | 21.7 | 166 | 37.1 | 18.2 | 69.2 |
| Invention | Run 23 | 49.1 | 50.9 | 22.8 | 126 | 36.9 | 18.1 | 69.0 |
| Invention | Run 24 | 49.2 | 50.8 | 22.8 | 133 | 39.2 | 19.3 | 70.1 |
| Invention | Run 25 | 49.2 | 50.8 | 18.5 | 138 | 34.4 | 16.9 | 67.7 |
| Invention | Run 26 | 49.2 | 50.8 | 21.0 | 119 | 37.6 | 18.5 | 69.3 |
| Invention | Run 27 | 49.9 | 50.1 | 22.0 | 98 | 36.1 | 18.0 | 68.1 |
| Invention | Run 28 | 49.9 | 50.1 | 21.1 | 97 | 41.3 | 20.6 | 70.7 |
| Invention | Run 29 | 52.2 | 47.8 | 17.7 | 144 | 32.4 | 16.9 | 64.7 |
| Invention | Run 30 | 52.2 | 47.8 | 16.7 | 138 | 34.3 | 17.9 | 65.7 |
| Invention | Run 31 | 52.6 | 47.4 | 13.8 | 128 | 45.8 | 24.1 | 71.5 |
| Invention | Run 32 | 53.2 | 46.8 | 16.6 | 141 | 35.3 | 18.8 | 65.6 |
| Invention | Run 33 | 53.5 | 46.5 | 16.7 | 137 | 33.6 | 18.6 | 65.1 |
| Invention | Run 34 | 54.1 | 45.9 | 20.8 | 121 | 34.0 | 18.4 | 64.3 |
| Invention | Run 35 | 54.1 | 45.9 | 20.3 | 180 | 40.7 | 22.0 | 67.9 |
| Invention | Run 36 | 54.4 | 45.6 | 21.0 | 172 | 39.0 | 21.2 | 66.8 |
| Invention | Run 37 | 54.5 | 45.6 | 20.0 | 138 | 41.7 | 22.7 | 68.3 |
| Invention | Run 38 | 54.7 | 45.3 | 20.2 | 138 | 37.8 | 20.7 | 66.0 |
| Invention | Run 39 | 54.7 | 45.3 | 18.8 | 125 | 41.9 | 22.9 | 68.2 |
| Invention | Run 40 | 55.0 | 45.0 | 18.0 | 123 | 40.0 | 22.0 | 67.0 |
| Invention | Run 41 | 55.6 | 45.4 | 18.5 | 117 | 35.3 | 19.6 | 65.0 |
| Invention | Run 42 | 55.7 | 45.3 | 21.1 | 133 | 35.1 | 19.6 | 64.9 |
| Invention | Run 43 | 55.8 | 44.2 | 20.0 | 131 | 42.8 | 23.9 | 68.1 |
| Invention | Run 44 | 57.3 | 42.7 | 14.9 | 144 | 38.9 | 22.3 | 65.0 |
| Invention | Run 45 | 57.5 | 42.5 | 15.1 | 141 | 35.1 | 20.1 | 62.6 |
| Invention | Run 46 | 57.9 | 42.1 | 20.7 | 116 | 41.8 | 24.2 | 66.3 |
| Invention | Run 47 | 58.1 | 41.9 | 20.8 | 113 | 45.4 | 26.4 | 68.3 |
| Invention | Run 48 | 58.3 | 41.7 | 20.8 | 114 | 36.4 | 21.2 | 62.9 |
| Invention | Run 49 | 59.2 | 40.8 | 20.2 | 199 | 40.5 | 24.0 | 64.8 |
| Invention | Run 50 | 59.5 | 40.5 | 20.4 | 144 | 42.5 | 25.3 | 65.8 |
| Invention | Run 51 | 59.6 | 40.4 | 19.9 | 94 | 42.3 | 25.2 | 65.6 |
| Invention | Run 52 | 61.4 | 38.6 | 17.1 | 140 | 44.1 | 27.1 | 65.7 |
| Invention | Run 53 | 62.2 | 37.8 | 16.9 | 137 | 42.4 | 26.4 | 64.2 |
| Invention | Run 54 | 63.1 | 36.9 | 14.8 | 155 | 38.0 | 24.0 | 60.9 |
| Invention | Run 55 | 63.1 | 36.9 | 14.6 | 142 | 39.0 | 24.6 | 61.5 |
| Invention | Run 56 | 64.0 | 36.0 | 13.3 | 118 | 46.4 | 29.7 | 65.7 |
| Invention | Run 57 | 64.5 | 35.5 | 17.2 | 100 | 51.3 | 33.1 | 68.6 |
| Invention | Run 58 | 64.7 | 35.3 | 17.5 | 99 | 42.7 | 27.6 | 62.9 |
| Invention | Run 59 | 65.0 | 35.0 | 12.1 | 142 | 47.2 | 30.7 | 65.7 |
| Invention | Run 60 | 65.2 | 34.8 | 16.2 | 120 | 39.9 | 26.0 | 60.8 |
| Invention | Run 61 | 65.7 | 34.3 | 11.3 | 148 | 46.4 | 30.5 | 64.8 |
| Invention | Run 62 | 65.7 | 34.3 | 10.0 | 156 | 43.2 | 28.4 | 62.7 |
| Invention | Run 63 | 65.8 | 34.2 | 15.9 | 126 | 41.5 | 27.3 | 61.5 |
| Invention | Run 64 | 65.9 | 34.1 | 15.9 | 107 | 42.5 | 28.0 | 62.1 |
| Invention | Run 65 | 66.2 | 33.8 | 15.5 | 127 | 40.8 | 27.0 | 60.8 |
| Invention | Run 66 | 66.6 | 33.4 | 14.7 | 113 | 41.4 | 27.6 | 61.0 |
| Invention | Run 67 | 66.8 | 33.2 | 16.5 | 108 | 50.0 | 33.4 | 66.6 |
| Invention | Run 68 | 67.1 | 32.9 | 9.3 | 161 | 43.5 | 29.2 | 62.1 |
| Invention | Run 69 | 67.1 | 32.9 | 13.9 | 140 | 41.9 | 28.1 | 61.0 |
| Invention | Run 70 | 67.1 | 32.9 | 13.7 | 141 | 40.1 | 26.9 | 59.8 |
| Invention | Run 71 | 69.3 | 30.7 | 19.2 | 107 | 45.1 | 31.5 | 61.6 |
| Invention | Run 72 | 69.9 | 30.1 | 19.2 | 107 | 45.1 | 31.5 | 61.6 |
| Control | Run 73 | 69.3 | 30.7 | 8.5 | 176 | 48.5 | 33.6 | 64.3 |
| Control | Run 74 | 69.4 | 30.6 | 8.6 | 201 | 43.1 | 29.9 | 60.5 |
| Control | Run 75 | 69.6 | 30.4 | 9.0 | 188 | 45.3 | 31.5 | 61.9 |
| Control | Run 76 | 70.1 | 29.9 | 9.3 | 224 | 35.8 | 25.1 | 55.0 |
| Control | Run 77 | 70.1 | 29.9 | 8.1 | 165 | 56.3 | 39.5 | 69.4 |

TABLE II-continued

POLYMER PROPERTIES

| | I | II | III | IV | V | VI | VII |
|---|---|---|---|---|---|---|---|
| | | | | | Weight % Vinyl (before Hydrogenation) | | |
| | (a)Butadiene Weight % | (b)Total Styrene Weight % | (c)Block Styrene Weight % | (d)Molecular Weight $M_n \times 10^{-3}$ | (e)based on butadiene | (f)based on copolymer | Vinyl + Styrene II + VI |
| Control Run 78 | 70.4 | 29.6 | 8.5 | 165 | 51.3 | 36.1 | 65.7 |

(a)Butadiene weight percent was calculated by subtracting the total styrene weight percent from 100.
(b)Total styrene percent was determined from the ultraviolet light absorption at 262 nanometers, of a polymer solution in chloroform containing approximately 0.5 grams of styrene per liter. A Cary Model 14 scanning UV Spectrophotometer was employed
(c)Block styrene content was determined by oxidative degradation based on the method of I. M. Kolthoff, T. S. Lee and C. W. Carr, J. Poly Sci, 429 (1946)
(d)Molecular weight was determined from gel permeation chromatography curves by a procedure described by G. Kraus and C. J. Stacy, J. Poly. Sci. A-2 10, 657 (1972) and J. Poly Sci. Symposium No. 43, 329 (1973).
(e)Weight-percent vinyl is defined as the weight percentage of butadiene that is polymerized by the 1,2-addition mode resulting in vinyl side groups, before hydrogenation. Vinyl weight percentage is normalized, i.e., it is based on polymerized butadiene monomer only. Vinyl weight percent was determined by infrared absorption spectroscopy at 11.0 microns, employing a Perkins-Elmer 283 BIR spectrophotometer and using a solution of approximately 2.5 grams of polymer in 100 milliliters of anhydrous carbon disulfide.
(f)Weight-percent vinyl based on the entire copolymer is defined as the weight of butadiene polymerized by the 1,2-addition mode, divided by the weight of the entire polymerized butadiene and styrene, multiplied by 100. It is calculated by multiplying the normalized weight percent vinyl (based on butadiene only) by the weight fraction of butadiene in the entire copolymer:

$$\frac{\text{Column I}}{\text{Column I} + \text{Column II}} \times \text{Column V}.$$

Twenty of these polymers are control items (Runs 1-14 and 73-78) having structural properties outside the claimed ranges of my invention. As can be seen by comparison of corresponding runs of Tables I and II, the vinyl content is controlled by the amount of tetrahydrofuran employed, whereas the molecular weight is controlled by the amount of n-butyllithium initiator and the reaction time.

EXAMPLE III

These data illustrate the desirable properties of my viscosity index improver polymers when dissolved in a premium motor oil of Formulation I:

| Formulation I | |
|---|---|
| Kansas City 10-Stock Oil(a) | 63.41 vol % |
| Kansas City 20-Stock Oil(b) | 20.43 vol % |
| Phil-Ad 100 Solution(c) | 14.3 vol. % |
| Lubrizol 1395(d) | 1.25 vol. % |
| Exxon ECA 5118 Solution(e) | 0.61 vol. % |

(a)A paraffinic, dewaxed base oil having a viscosity of approximately 100 SUS at 100° F.; commercially available from Phillips Petroleum Company.
(b)A paraffinic, dewaxed base oil having a viscosity of approximately 329 SUS at 100° F. commercially available from Phillips Petroleum Company.
(c)A 50 volume % solution of a commercially available overbased calcium petroleum sulfonate detergent in Kansas City 10-Stock oil.
(d)A commercially available zinc dialkyldithiophosphate antioxidant and antiwear agent.
(e)A 50 volume % solution of a commercially available pour point depressant in Kansas City 10-Stock oil.

Viscosity at 210° F., viscosity index, pour point and sonic shear loss (a measure of shear stability) of solutions of my VI improver polymers in Formulation I motor oil are listed in Table III.

TABLE III

OIL SOLUTION PROPERTIES

| | | VIII Polymer Concentration, Weight % | IX Viscosity at 210° F., SUS(a) | X Viscosity Index(b) | XI Pour Point, °F.(c) | XII Sonic Shear Loss, SUS(d) |
|---|---|---|---|---|---|---|
| Control | Run 1 | 1.8 | 71.8 | 182 | −35 | 1.8 |
| Control | Run 2 | 2.2 | 74.1 | 183 | −35 | 1.7 |
| Control | Run 3 | 2.4 | 75.0 | 193 | −40 | 0.7 |
| Control | Run 4 | 1.3 | 74.8 | 190 | −35 | 5.5 |
| Control | Run 5 | 2.4 | 75.4 | 194 | −40 | 1.1 |
| Control | Run 6 | 1.2 | 73.4 | 187 | −35 | 4.1 |
| Control | Run 7 | 1.8 | 74.1 | 187 | −35 | 1.5 |
| Control | Run 8 | 1.3 | 73.3 | 192 | −40 | 3.1 |
| Control | Run 9 | 1.84 | 74.1 | 188 | −35 | 1.4 |
| Control | Run 10 | 1.76 | 73.7 | 189 | −35 | 1.3 |
| Control | Run 11 | 2.0 | 73.9 | 195 | −40 | 0.2 |
| Control | Run 12 | 1.68 | 74.8 | 187 | −35 | 1.5 |
| Control | Run 13 | 1.66 | 73.7 | 183 | −35 | 1.3 |
| Control | Run 14 | 1.66 | 73.3 | 186 | −40 | 1.5 |
| Invention | Run 15 | 1.60 | 73.9 | 182 | −35 | 1.3 |
| Invention | Run 16 | 1.60 | 74.3 | 188 | −40 | 1.7 |
| Invention | Run 17 | 1.60 | 75.1 | 188 | −30 | 1.4 |
| Invention | Run 18 | 1.30 | 73.3 | 184 | −15 | 1.8 |
| Invention | Run 19 | 1.30 | 72.1 | 189 | −40 | 1.9 |
| Invention | Run 20 | 1.32 | 71.7 | 185 | −35 | 2.1 |
| Invention | Run 21 | 1.32 | 73.4 | 179 | −20 | 2.0 |
| Invention | Run 22 | 1.29 | 73.1 | 171 | −30 | 3.1 |
| Invention | Run 23 | 1.30 | 72.4 | 187 | −40 | 2.5 |
| Invention | Run 24 | 1.32 | 71.7 | 188 | −40 | 2.3 |
| Invention | Run 25 | 1.30 | 74.8 | 183 | −35 | 2.4 |
| Invention | Run 26 | 1.32 | 71.8 | 189 | −40 | 2.1 |
| Invention | Run 27 | 1.42 | 74.4 | 184 | −35 | 1.2 |
| Invention | Run 28 | 1.52 | 75.4 | 185 | −35 | 1.4 |
| Invention | Run 29 | 1.08 | 73.4 | 187 | −35 | 3.4 |

TABLE III-continued

| | | OIL SOLUTION PROPERTIES | | | |
|---|---|---|---|---|---|
| | | VIII Polymer Concentration, Weight % | IX Viscosity at 210° F., SUS[a] | X Viscosity Index[b] | XI Pour Point, °F.[c] | XII Sonic Shear Loss, SUS[d] |

| | | VIII | IX | X | XI | XII |
|---|---|---|---|---|---|---|
| Invention | Run 30 | 1.09 | 72.9 | 186 | −40 | 3.2 |
| Invention | Run 31 | 1.16 | 74.1 | 180 | −40 | 2.7 |
| Invention | Run 32 | 1.09 | 72.4 | 185 | −35 | 3.4 |
| Invention | Run 33 | 1.04 | 76.0 | 185 | −25 | 3.0 |
| Invention | Run 34 | 1.18 | 72.6 | 185 | −25 | 6.3 |
| Invention | Run 35 | 1.18 | 72.4 | 171 | −30 | 3.5 |
| Invention | Run 36 | 1.16 | 72.6 | 172 | −40 | 2.9 |
| Invention | Run 37 | 1.20 | 74.0 | 190 | −35 | 2.9 |
| Invention | Run 38 | 1.14 | 72.9 | 182 | −35 | 3.0 |
| Invention | Run 39 | 1.15 | 73.0 | 194 | −35 | 2.8 |
| Invention | Run 40 | 1.13 | 72.8 | 184 | −35 | 2.7 |
| Invention | Run 41 | 1.17 | 72.7 | 183 | −35 | 2.7 |
| Invention | Run 42 | 1.16 | 74.1 | 187 | −30 | 2.7 |
| Invention | Run 43 | 1.01 | 72.5 | 184 | −30 | 3.2 |
| Invention | Run 44 | 0.96 | 73.1 | 184 | −35 | 3.8 |
| Invention | Run 45 | 0.97 | 72.9 | 184 | −30 | 3.4 |
| Invention | Run 46 | 1.14 | 72.9 | 184 | −35 | 2.4 |
| Invention | Run 47 | 1.16 | 72.7 | 183 | −40 | 2.6 |
| Invention | Run 48 | 1.14 | 72.6 | 185 | −25 | 2.6 |
| Invention | Run 49 | 1.03 | 73.5 | 168 | −35 | 3.7 |
| Invention | Run 50 | 1.08 | 72.9 | 185 | −35 | 2.7 |
| Invention | Run 51 | 1.30 | 75.0 | 169 | −35 | 1.6 |
| Invention | Run 52 | 0.97 | 73.4 | 183 | −30 | 3.6 |
| Invention | Run 53 | 0.97 | 73.4 | 182 | −25 | 3.4 |
| Invention | Run 54 | 0.83 | 72.5 | 183 | −25 | 4.4 |
| Invention | Run 55 | 0.90 | 73.0 | 180 | −30 | 3.8 |
| Invention | Run 56 | 1.20 | 74.3 | 150 | −30 | 1.9 |
| Invention | Run 57 | 1.28 | 72.2 | 144 | −35 | 1.6 |
| Invention | Run 58 | 1.24 | 73.9 | 142 | −35 | 1.7 |
| Invention | Run 59 | 1.0 | 74.7 | 156 | −35 | 2.7 |
| Invention | Run 60 | 1.01 | 74.4 | 167 | −15 | 2.6 |
| Invention | Run 61 | 0.97 | 74.8 | 153 | −40 | 3.0 |
| Invention | Run 62 | 0.92 | 73.6 | 145 | −40 | 3.1 |
| Invention | Run 63 | 0.87 | 73.6 | 170 | −30 | 2.8 |
| Invention | Run 64 | 1.22 | 74.0 | 136 | −25 | 2.0 |
| Invention | Run 65 | 0.96 | 74.4 | 169 | −25 | 2.8 |
| Invention | Run 66 | 1.10 | 74.1 | 145 | −30 | 2.3 |
| Invention | Run 67 | 1.26 | 74.1 | 138 | −40 | 1.9 |
| Invention | Run 68 | 0.88 | 74.8 | 152 | −35 | 4.0 |
| Invention | Run 69 | 0.84 | 73.9 | 167 | −30 | 3.6 |
| Invention | Run 70 | 0.91 | 73.5 | 151 | −25 | 2.9 |
| Invention | Run 71 | 1.10 | 75.3 | 169 | −30 | 1.8 |
| Invention | Run 72 | 1.10 | 75.3 | 169 | −30 | 1.8 |
| Control | Run 73 | 0.62 | 74.7 | 164 | −15 | 6.8 |
| Control | Run 74 | 0.68 | 74.8 | 118 | −30 | 3.4 |
| Control | Run 75 | 0.65 | 73.2 | 166 | −20 | 5.5 |
| Control | Run 76 | 0.62 | 74.7 | 171 | +10 | 8.3 |
| Control | Run 77 | 1.10 | 75.4 | 114 | −35 | 3.8 |
| Control | Run 78 | 0.68 | 73.9 | 153 | −30 | 4.1 |

[a]Determined according to ASTM D455-74
[b]Determined according to ASTM D2270-75
[c]Determined according to ASTM D97-66
[d]The SUS viscosity at 210° F. (99° C.) of a 2.0 weight percent solution of polymer in a base oil solution before and after irradiation for 6.5 minutes at 100° F. (38° C.) jacket temperature in a Raytheon Model DF101 sonic oscillator operated at 10 kilocycles per second. The SUS viscosity is determined according to ASTM D455-74.

Polymer concentrations were chosen so as to give a viscosity of 74±2 SUS at 210° F.

With the exception of inventive Run 34, the oil solutions of my VI improver polymers (Runs 15 to 72) exhibit a highly desirable combination of low concentration (0.8 to 1.6 weight-%), acceptable viscosity at 210° F. (71.7 to 76.0 SUS), acceptable viscosity index (136–194), low pour point (−40° to −15° F.), and low sonic shear loss (1.2 to 4.4 SUS). The excessively high sonic shear loss of inventive Run 34 cannot be explained and is believed obviously an experimental or recording error.

EXAMPLE IV

These data illustrate that viscosity index improver butadiene-styrene random block copolymers do not provide acceptable shear stability (sonic shear loss) when the molecular weight is increased to above 210,000 ($M_n$), as is shown below in Table IV.

TABLE IV

| | Butadiene Weight % | Styrene Block Weight % | % Vinyl (based on butadiene) | Molecular Weight $M_n$ | Concentration in oil (Weight %) | Viscosity at 210° F. (SUS) | Sonic Shear Loss (SUS) |
|---|---|---|---|---|---|---|---|
| Run 79 | 35.8 | 27.5 | 26.5 | 144 | 1.8 | 71.8 | 1.8 |
| Run 80 | 36.5 | 28.9 | 25.5 | 226 | 1.3 | 74.8 | 5.5 |
| Run 81 | 37.3 | 28.3 | 24.9 | 276 | 1.2 | 73.4 | 4.5 |
| Run 82 | 36.1 | 30.9 | 25.8 | 336 | 1.1 | 75.9 | 7.7 |

TABLE IV-continued

|  | Butadiene Weight % | Styrene Block Weight % | % Vinyl (based on butadiene) | Molecular Weight $M_n$ | Concentration in oil (Weight %) | Viscosity at 210° F. (SUS) | Sonic Shear Loss (SUS) |
| --- | --- | --- | --- | --- | --- | --- | --- |
| Run 83 | 35.7 | 29.0 | 26.6 | 399 | 1.0 | 75.6 | 9.9 |
| Run 84 | 39.0 | 20.2 | 31.5 | 200 | 1.3 | 73.3 | 3.1 |
| Run 85 | 38.7 | 28.1 | 33.6 | 211 | 1.4 | 72.8 | 5.8 |
| Run 86 | 38.1 | 24.9 | 31.2 | 306 | 1.2 | 75.0 | 6.4 |
| Run 87 | 59.5 | 20.4 | 42.5 | 144 | 1.1 | 72.9 | 2.7 |
| Run 88 | 59.4 | 19.8 | 43.4 | 206 | 1.0 | 72.7 | 5.0 |
| Run 89 | 69.9 | 19.2 | 35.8 | 107 | 1.1 | 75.3 | 1.8 |
| Run 90 | 70.1 | 9.3 | 45.1 | 224 | 0.6 | 74.7 | 8.3 |

The disclosure, including data, illustrate the value and effectiveness of my invention. The examples, the knowledge and background of the field of the invention and general principles of chemistry and other applicable sciences have formed the basis from which the broad descriptions of the invention including the ranges of conditions and generic groups of operant components have been developed, which have formed the basis for my claims here appended.

I claim:

1. Shear-stable, mineral oil-based compositions comprising a major amount of a mineral base oil, and a minor effective viscosity improving amount of an oil-soluble hydrogenated conjugated diene/monovinylarene random block copolymer dissolved therein, said copolymer characterized by:

polymerized conjugated diene content: 44-70 weight percent total copolymerized monovinylarene content: 56-30 weight percent block monovinylarene content: 9-23 weight percent molecular weight $M_n$: 94,000-199,000 vinyl, before hydrogenation, based on conjugated diene: 30-51 weight percent vinyl, before hydrogenation, based on entire copolymer: 13-33 weight percent weight percent vinyl, based on copolymer, plus weight percent monovinylarene: 60-72.

2. The oil based composition according to claim 1, wherein said conjugated diene of said random block copolymer is 1,3-butadiene and said monovinylarene is styrene.

3. Shear-stable, mineral oil based compositions comprising a major amount of an mineral base oil, and a minor effective viscosity-improving amount of an oil-soluble butadiene/styrene random block copolymer dissolved therein, said copolymer characterized by:

polymerized butadiene content: 52.2-69.9 weight percent total copolymerized styrene content: 47.8-30.1 weight percent block styrene content: 9.3-21.0 weight percent molecular weight, $M_n$: 94,000-199,000 vinyl, before hydrogenation, based on butadiene: 32.4-51.3 weight percent vinyl, before hydrogenation based on entire copolymer: 16.9-33.4 weight percent weight percent vinyl, based on copolymer, plus weight percent styrene: 59.8-7.15 weight percent.

4. The oil based composition according to claim 1 wherein the mineral oil is lubricating oil and has a viscosity at 210° F.-212° F. in the range of about 72 to 76 SUS, and said random block copolymer is employed in a range of about 0.8 to 1.6 weight percent.

5. The oil based composition according to claim 3 wherein said random block copolymer is employed in an amount in the range of about 1.0 to 2.1 weight percent relative to the total oil excluding other additives.

6. The oil based composition according to claim 1 wherein said random block copolymer is a copolymer of isoprene and styrene, butadiene and alpha-methyl styrene, or isoprene and alpha-methyl styrene.

7. The oil based composition according to claim 1 wherein said random block copolymer is selected from copolymers represented by B/A-A, A/B-A, wherein B/A and A/B each represent a randomized block of conjugated diene/monovinylarene which can be tapered, and A represents a homopolymeric block of polymerized monovinylarene.

8. The oil based composition of claim 4 wherein said base oil is a lubricating oil, and said random block copolymer is employed in an amount of about 0.8 to 1.2 weight percent relative to said base oil.

9. The oil based composition of claim 4 wherein said base oil is an automotive transmission fluid wherein said random block copolymer is employed in an amount of about 0.4 to 1.0 weight percent.

10. The oil based composition of claim 4 wherein said base oil is an aviation oil wherein said random block copolymer is employed in an amount of about 0.3 to 0.8 weight percent.

11. Hydrogenated random block copolymer characterized by:

polymerized conjugated diene content: 44.1-69.9 weight percent copolymerized monovinylarene content: 55.9-30.1 weight percent block monovinylarene content: 9.3-23.2 weight percent molecular weight $M_n$: 94,000-199,000 vinyl, before hydrogenation, based on conjugated diene: 30.2-51.3 weight percent vinyl, before hydrogenation, based on entire copolymer: 13.3-33.4 weight percent weight percent vinyl, based on copolymer, plus weight percent monovinylarene: 59.8-71-5 wherein the extent of hydrogenation is sufficient to substantially saturate olefinic double bonds, without substantial saturation of aromatic double bonds.

12. A hydrogenated copolymer according to claim 11 wherein said monovinylarene is styrene and said conjugated diene is 1,3-butadiene.

13. The hydrogenated random block copolymer according to claim 12 characterized by:

polymerized butadiene content: 52.2-69.9 weight percent total copolymerized styrene content: 47.8-30.1 weight percent block styrene content: 9.3-21.0 weight percent molecular weight, $M_n$: 94,000-199,000 vinyl, before hydrogenation, based on butadiene: 32.4–51.3 weight percent vinyl, before hydrogenation, based on entire copolymer: 16.9–33.4 weight percent weight percent vinyl, based on copolymer, plus weight percent styrene: 59.8–71.5 weight percent.

14. Mineral oil-based concentrates compositions comprising a major amount of a mineral base oil, and 5 to 30 weight percent of an oil-soluble hydrogenated conjugated diene/monovinylarene random block copolymer dissolved therein, said copolymer characterized by:

polymerized conjugated diene content: 44.1–69.9 weight percent total copolymerized monovinylarene content: 55.9–30.1 weight percent block monovinylarene content: 9.3–23.2 weight percent molecular weight $M_n$: 94,000–199,000 vinyl, before hydrogenation, based on conjugated diene: 30.2–51.3 weight percent vinyl, before hydrogenation, based on entire copolymer: 13.3–33.4 weight percent weight percent vinyl, based on copolymer, plus weight percent styrene: 59.8–71.5.

15. The oil based composition according to claim 14, wherein in said random block copolymer said conjugated diene is butadiene, said monovinylarene is styrene, and said butadiene/styrene random block copolymer is characterized by:

polymerized butadiene content: 52.2–69.9 weight percent total copolymerized styrene content: 47.8–30.1 weight percent block styrene content: 9.3–21.0 weight percent molecular weight, $M_n$: 94,000–199,000 vinyl, before hydrogenation based on butadiene: 32.4–51.3 weight percent vinyl, before hydrogenation, based on entire copolymer: 16.9–33.4 weight percent weight percent vinyl, based on copolymer, plus weight percent styrene: 59.8–71.5 weight percent.

16. The oil based concentrate according to claim 14, wherein the conjugated diene of said random block copolymer is 1,3-butadiene and the monovinylarene of said random block copolymer is styrene.

17. The concentrate composition according to claim 15 wherein said random block copolymer is the copolymer of isoprene and styrene, butadiene and alpha-methyl styrene, or isoprene and alpha-methyl styrene.

18. The oil-based composition according to claim 3 wherein said mineral base oil is a lubricating oil of about 72 SUS viscosity at 210°–212° F., and employing in said composition said random block copolymer in the range of about 0.8 to 1.6 weight percent.

19. The oil-based composition according to claim 1 employing about 1 to 2.1 weight percent said random block copolymer.

20. The oil based composition of claim 18 wherein said base oil is a lubricating oil, and said random block copolymer is employed in an amount of about 0.8 to 1.2 weight percent relative to said base oil.

21. The oil based composition of claim 18 wherein said base oil is an automotive transmission fluid wherein said random block copolymer is employed in an amount of about 0.4 to 1.0 weight percent.

22. The oil based composition of claim 18 wherein said base oil is an aviation oil wherein said random block copolymer is employed in an amount of about 0.3 to 0.8 weight percent.

* * * * *

UNITED STATES PATENT AND TRADEMARK OFFICE
CERTIFICATE OF CORRECTION

PATENT NO. : 4,412,087
DATED : Oct. 25, 1983
INVENTOR(S) : William J. Trepka

It is certified that error appears in the above-identified patent and that said Letters Patent are hereby corrected as shown below:

Col. 17, line 61, Claim 3, line 17, "7.15" should be

--- 71.5 ---.

Signed and Sealed this

Seventh Day of February 1984

[SEAL]

Attest:

GERALD J. MOSSINGHOFF

Attesting Officer

Commissioner of Patents and Trademarks